United States Patent [19]
Nishii

[11] Patent Number: 5,367,915
[45] Date of Patent: Nov. 29, 1994

[54] AUTOMATIC PRESSURE CONTROL DEVICE FOR A BALL SCREW

[75] Inventor: Kouji Nishii, Nara, Japan

[73] Assignee: Asuka Trading Co., Ltd., Yamato Takada, Japan

[21] Appl. No.: 644,504

[22] Filed: Jan. 23, 1991

[30] Foreign Application Priority Data

Sep. 20, 1990 [JP] Japan ................. 2-253593

[51] Int. Cl.⁵ ............................. F16H 55/18
[52] U.S. Cl. ............................. 74/441; 74/459
[58] Field of Search ............. 74/441, 459; 192/88 A

[56] References Cited

U.S. PATENT DOCUMENTS

| | | | |
|---|---|---|---|
| 2,992,955 | 7/1961 | Bowerman | 192/88 A |
| 3,053,106 | 9/1962 | Goldman | 74/441 |
| 3,780,989 | 12/1973 | Peterson | 192/88 A X |
| 3,851,541 | 12/1974 | Ploss et al. | 74/441 X |
| 4,114,470 | 9/1978 | Sharpe | 74/441 |
| 4,487,087 | 12/1984 | Johnstone | 74/441 X |
| 4,577,845 | 3/1986 | Kimura et al. | 74/441 X |
| 4,586,394 | 5/1986 | Perkins | 74/441 X |
| 4,624,355 | 11/1986 | Mroz | 192/88 A X |

Primary Examiner—Allan D. Herrmann
Assistant Examiner—David W. Laub
Attorney, Agent, or Firm—Morrison Law Firm, Thomas R. Morrison

[57] ABSTRACT

Varying fluid pressure varies the thickness of an elastic spacer between ball nuts of the ball screw. The spacer thickness determines opposed axial forces applied to the ball nuts. During a high-speed excursion of the screw, pressure in the elastic spacer is reduced, thus reducing friction between the ball nuts and the screw. When the screw is being fine positioned for precise operation, pressure in the elastic spacer is increased, thereby urging the ball nuts apart to eliminate play in the ball screw.

12 Claims, 3 Drawing Sheets

AUTOMATIC PRESSURE CONTROL DEVICE FOR A BALL SCREW

BACKGROUND OF THE INVENTION

The present invention relates to ball screws, and more particularly to an automatic pressure device for a ball screw.

The use of ball screws for positioning workpieces and the like in precision and numerically controlled machine tools and other linear positioning devices is well known. While the high strength and durability of ball screws make them highly desireable for use in these applications, excessive play and backlash can reduce their accuracy in precision positioning.

In a conventional ball screw, play is reduced by inserting a ring or cushion between adjacent ball nuts, causing balls of the respective ball nuts to bear on opposite walls of a spiral groove in a ball screw shaft. While this is effective in reducing shaft play, the heat generated by the resulting constant friction between the balls and the groove walls of the rotating shaft expands components of the ball screw, degrading precision operation.

OBJECTS AND SUMMARY OF THE INVENTION

Accordingly, it is an object of the invention to provide a pressure control device that overcomes the drawbacks of the prior art.

It is a further object of the invention to provide a device that automatically controls the pressure applied between ball nuts to control the build up of friction-caused heat during extended or high speed operation of a ball screw.

Briefly stated, the present invention provides a device in which varying fluid pressure varies the thickness of an elastic spacer between ball nuts of the ball screw. The spacer thickness determines opposed axial forces applied to the ball nuts. During a high-speed excursion of the screw, pressure in the elastic spacer is reduced, thus reducing friction between the ball nuts and the screw. When the screw is being fine positioned for precise operation, pressure in the elastic spacer is increased, thereby urging the ball nuts apart to eliminate play in the ball screw.

According to an embodiment of the invention, there is provided a device for controlling friction in a positioning screw apparatus comprising: a rotatable screw, at least a first nut and a second nut rotationally joined together on the screw, a controller for controlling the device, controllable means, responsive to the controller for producing an opposing axial force between the first nut and the second nut, the controllable means being effective for increasing the force during a first portion of operation of the rotatable screw, and for decreasing the force during a second portion of operation of the rotatable screw.

According to a feature of the invention, there is provided a device for controlling friction in a positioning screw apparatus comprising: first and second nuts on a positioning screw, an elastic spacer between the first and a second nuts, a controller for controlling the device, controllable means, responsive to the controller, for varying a thickness of the elastic spacer, the controller increasing the thickness to urge apart the first nut and the second nut to increase the friction between the first nut and the second nut and the screw during a first portion of an operation of the device, and decreasing the thickness to reduce the friction during a second portion of operation of the device.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
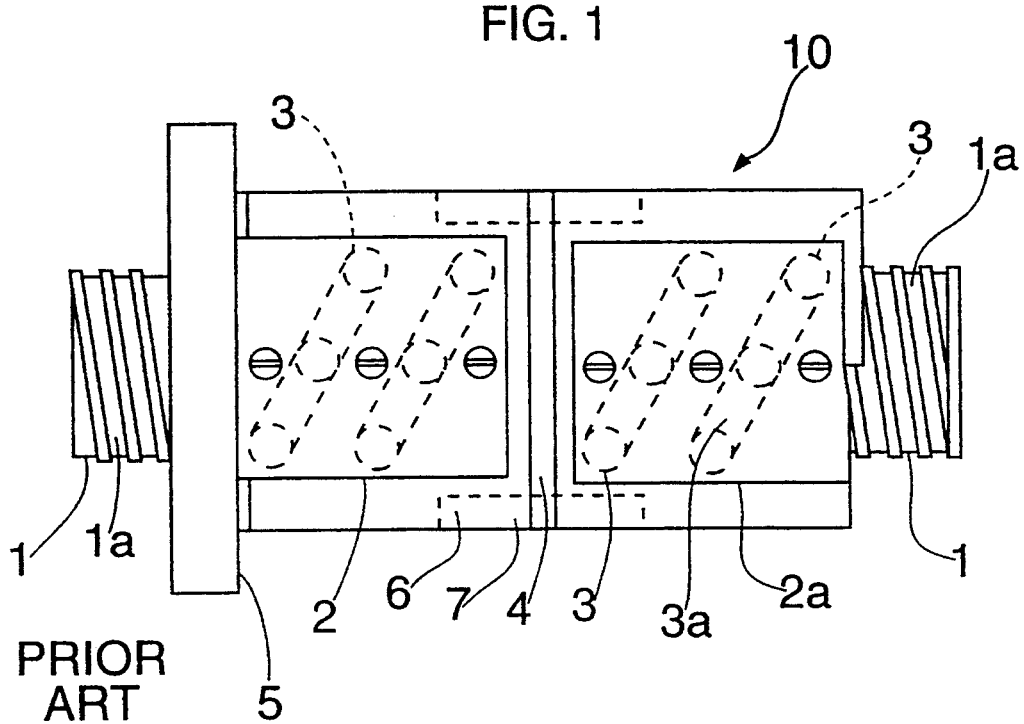
FIG. 1 shows a ball screw assembly of the prior art, with the position of the balls and the ball nut ball grooves shown in dashed lines.

Referring to FIG. 1, a shaft 1 of a ball screw assembly 10, having a spiral ball groove 1a along its length, rotatably supports first and second ball nuts 2 and 2a. A plurality of balls 3, between shaft 1 and ball nuts 2 and 2a in ball groove 1a and nut ball grooves 3a, form a loose, rotatable interface between shaft 1 and ball nuts 2 and 2a.

A donut shaped spacer 4 rings shaft 1 between ball nuts 2 and 2a, urging them apart. An endplate 5 at an end of first ball nut 2 prevents ball nuts 2 and 2a and spacer 4 from rotating with shaft 1. A key 6 in a keyway 7 extends through ball nuts 2 and 2a, thereby locking them together rotationally.

During operation shaft 1 rotates. The screw action of balls 3 riding along ball groove 1a of shaft 1 causes a linear movement of shaft 1 along its axis relative to ball nuts 2 and 2a. When the linear position of shaft 1 is fixed, ball nuts 2 and 2a move linearly. When the linear position of ball nuts 2 and 2a is fixed, shaft 1 moves linearly. The direction of movement is determined by the direction of rotation (clockwise or counterclockwise) of shaft 1.

Because of the loose contact between ball nuts 2 and 2a, balls 3 and the walls of ball groove 1a, there is significant play between shaft 1 and ball nuts 2 and 2a. In a conventional ball screw assembly 10, this play is minimized by spacer 4. Spacer 4 between ball nuts 2 and 2a, forces balls 3 to press against opposite side walls of ball groove 1a, eliminating play and permitting precise positioning of shaft 1 or ball nuts 2 and 2a.

The force exerted by spacer 4 must be great enough to maintain precision during acceleration and deceleration of ball shaft 1a. However, at constant speed, a smaller force would be sufficient to maintain the required precision. However, the apparatus of the prior art, shown in FIG. 1, maintains a constant force, at all speeds and accelerations. The resulting constant force produced by spacer 4 creates constant friction between balls 3, the walls of ball shaft 1a and nut ball grooves 3a, generating heat. This is especially undesirable during long, high speed excursions of the moving component. Resultant heat expansion of the components of ball screw assembly 10 significantly degrades precision operation. In addition, the high friction increases wear on the bearing components.

Figure 2:
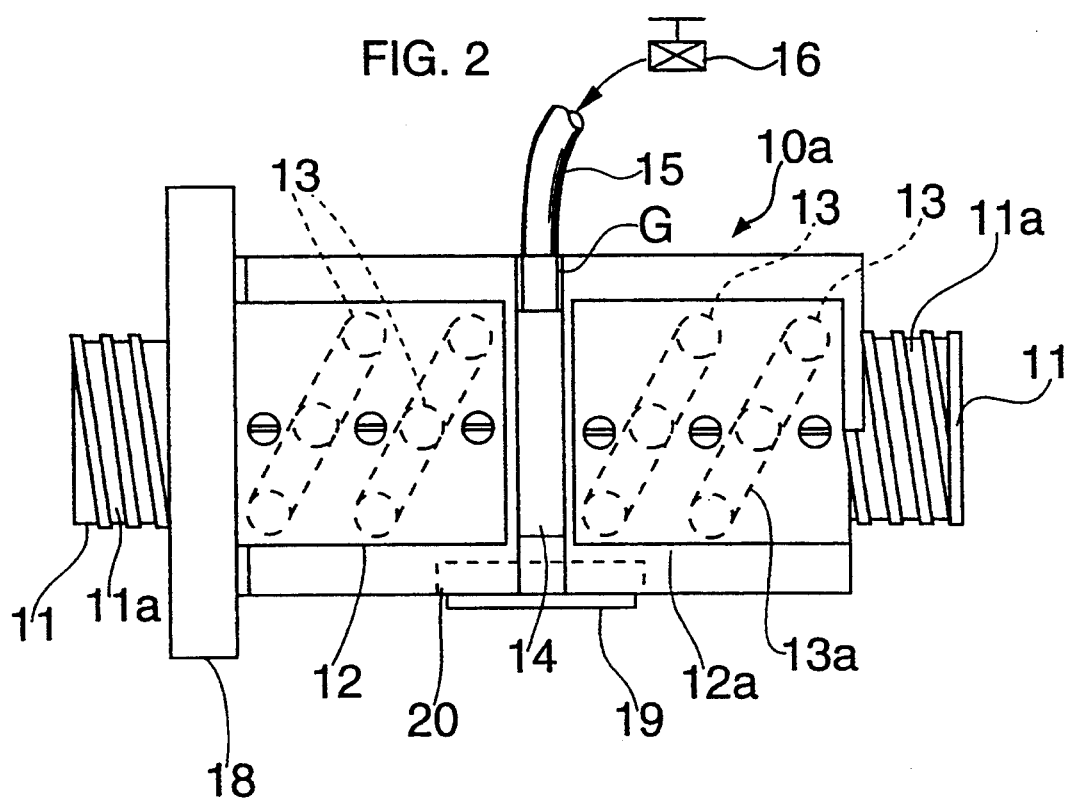
FIG. 2 shows a ball screw assembly of an embodiment of the present invention, with the position of the balls and the ball nut ball grooves shown in dashed lines.
Figure 3:
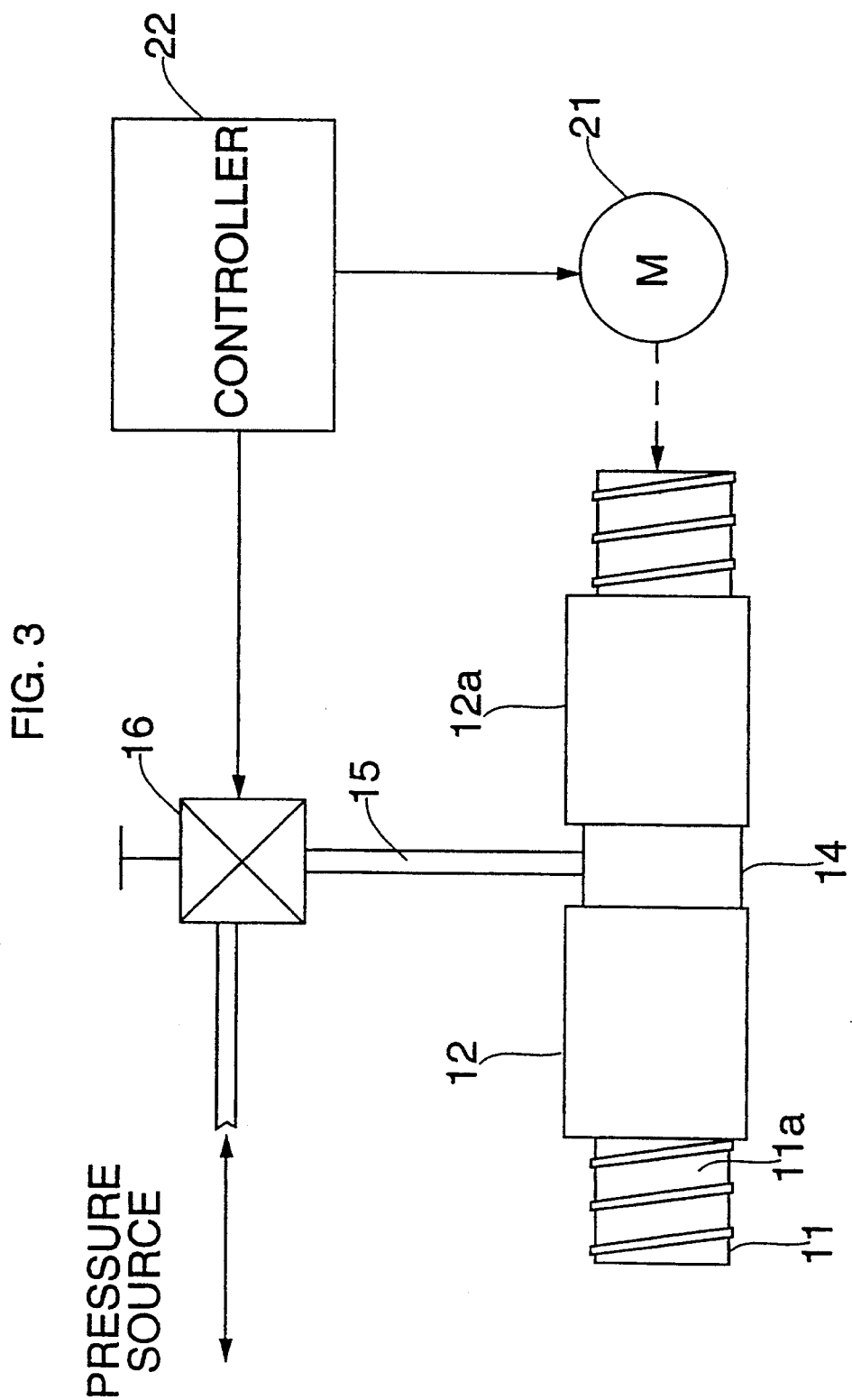
FIG. 3 is a functional block diagram of the present invention.

Referring to FIGS. 2 and 3, a shaft 11 of a ball screw assembly 10a has a spiral ball groove 11a along its length. Shaft 11 rotatably supports a first ball nut 12 and a second ball nut 12a. A plurality of balls 13 between shaft 11 and ball nuts 12 and 12a in ball groove 11a and ball nut grooves 13a form a loose interface between shaft 11 and ball nuts 12 and 12a. A donut shaped inflatable elastic spacer 14 rings shaft 11 between ball nuts 12 and 12a. An endplate 18 at an end of first ball nut 12 prevents ball nuts 12 and 12a and elastic spacer 14 from rotating with shaft 11. A key 19 in a keyway 20 extends through both ball nuts 12 and 12a, thereby locking them together.

A first end of a flow pipe 15 is connected to elastic spacer 14. A second end of flow pipe 15 is connected to a controllable valve 16. Controllable valve 16 regulates fluid pressure in elastic spacer 14 under the control of a controller 22. Controller 22 also controls the direction and speed of a motor 21, for example, a stepping motor, which rotates shaft 11.

During operation, shaft 11 is rotated by motor 21 under the control of controller 22. The screw action of balls 13 riding along rotating ball groove 11a of shaft 11 causes a linear movement of shaft 11 along its axis, relative to ball nuts 12 and 12a. When the linear position of shaft 11 is fixed, first ball nut 12 and second ball nut 12a move. When the linear position of first ball nut 12 and second ball nut 12a is fixed, shaft 11 moves. The direction of the linear movement is determined by the direction of rotation (clockwise or counterclockwise) of shaft 11.

Play between ball nuts 12 and 12a, balls 13 and the walls of ball groove 11a is controlled by elastic spacer 14, the thickness of which is regulated by varying its internal fluid pressure. Increasing the pressure in elastic spacer 14, balls 13 of ball nuts 12 and 12a presses against opposite side walls of ball groove 11a, eliminating undesirable play and permitting precision positioning of shaft 11 or ball nuts 12 and 12a. Decreasing the pressure in elastic spacer 14, reduces the friction between balls 13 and the walls of ball groove 11a and thus minimizes heat buildup. High pressure is used during acceleration and deceleration, and low pressure is used during constant speed operation which is typical of long, high speed excursions of shaft 11 or ball nuts 12 and 12a. Controller 22 adjusts the amount of pressure to elastic spacer 14 through controllable valve 16.

When many high speed rotations of shaft 11 are required to position the workpiece, controller 22 drives motor 21 at high speed, in the desired direction. In order to reduce friction between balls 13 and the walls of shaft 11 and ball nuts 12 and 12a, controller 22 reduces pressure through controllable valve 16, deflating elastic spacer 14. When elastic spacer 14 is deflated, balls 13 loosely contact the walls of ball groove 11a. As a result, little friction heat is generated during these rapid rotations. As shaft 11 approaches its final position, controller 22 slows motor 21 and causes controllable valve 16 and the pressure source to increase the fluid pressure to elastic spacer 14. As elastic spacer 14 expands, first ball nut 12 and second ball nut 12a are urged apart, forcing balls 13 against the walls of ball groove 11a. This increases the friction between ball nuts 12 and 12a, balls 13, and the walls of ball groove 11a minimizing play in ball screw assembly 10a, allowing precise positioning. Controller 22 stops motor 21 when shaft 11 is precisely positioned.

If a long transit is required, precision may not be required at the beginning of motion, but only at the end. In that case, controller 22 may maintain a low pressure in elastic spacer 14 during startup and during the run toward a final position. Then, as the final position is approached, controller may begin to apply a strong pressure to establish final positioning precision.

Because elastic spacer 14 applies pressure only during the final positioning of the workpiece, heat caused by friction is minimized and the resultant negligible thermal expansion of the components of ball screw assembly 10a has no effect on the precision operation of ball screw assembly 10. Wear is also minimized.

The present invention provides a ball screw device that takes advantage of the high strength and low friction characteristics of ball screws, while providing rigidity and precision positioning.

While the preferred embodiment of the present invention is described using a positive fluid pressure to adjust the thickness of elastic spacer 14, one skilled in the art will recognize that the invention works equally well when operated by a controllable vacuum system or the like. The fluid may be a compressible fluid, such as air, or an incompressible fluid such as oil.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for controlling friction in a positioning screw apparatus comprising:
   a rotatable screw;
   at least a first nut and a second nut rotationally joined together on said screw;
   a controller for controlling said device;
   controllable means, responsive to said controller, for producing an opposing axial force between said first nut and said second nut;
   said controllable means including an elastic spacer;
   a source of fluid pressure;
   means for making a thickness of said elastic spacer responsive to a said fluid pressure;
   a controllable valve controlling application of said fluid pressure to said elastic spacer;
   said controllable valve being responsive to said controller; and
   said controllable means being effective for increasing said force during a first portion of operation of said rotatable screw, and for decreasing said force during a second portion of operation of said rotatable screw.

2. The device of claim 1, wherein:
   said controller is responsive to an acceleration of said screw;
   said fluid pressure to said elastic spacer being varied to vary said thickness of said elastic spacer with a rate of rotation of said screw; and
   said axial force varying with said thickness.

3. The device of claim 1, wherein said controller controls said controllable valve in response to at least one of an acceleration and a deceleration of said screw.

4. The device of claim 1, wherein said fluid pressure arises in a compressible fluid.

5. The device of claim 1, wherein said fluid pressure arises in a non-compressible fluid.

6. The device of claim 1, wherein: said screw positioning apparatus is a ball screw.

7. A device for controlling friction in a positioning screw apparatus comprising:
first and second nuts on a positioning screw;
an elastic spacer between said first and a second nuts;
a controller for controlling said device;
controllable means, responsive to said controller, for varying a thickness of said elastic spacer;
said controller increasing said thickness to urge apart said first nut and said second nut to increase said friction between said first nut and said second nut and said screw during a first portion of an operation of said device; and
decreasing said thickness to reduce said friction during a second portion of operation of said device.

8. The device of claim 7, wherein:
said thickness of said elastic spacer is responsive to a fluid pressure;
a source of a fluid pressure; and
a controllable valve, responsive to said controller, for controlling application of said fluid pressure to said elastic spacer.

9. The device of claim 8, wherein:
said controller is responsive to a rotation rate of said screw; and
said controller varies said fluid pressure to said elastic spacer in response to said rotation rate.

10. The device of claim 8, wherein:
said controller is responsive to an acceleration of said screw; and
said controller varies said fluid pressure to said elastic spacer in response to said acceleration.

11. The device of claim 8, wherein said fluid pressure arises in a compressible fluid.

12. The device of claim 8, wherein said fluid pressure arises in an incompressible fluid.

* * * * *